Feb. 20, 1968
L. L. ANDERSON
3,369,637
THROTTLE CONTROL
Filed Dec. 10, 1965
3 Sheets-Sheet 1
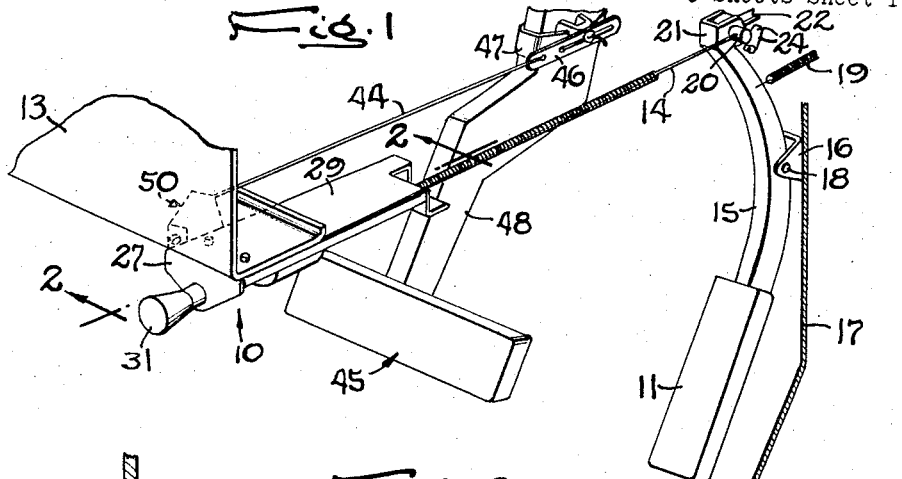
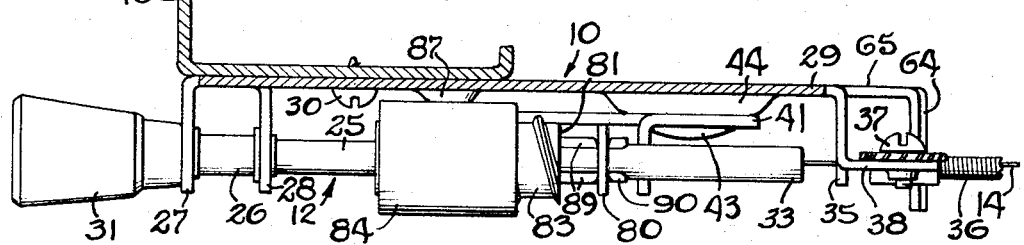
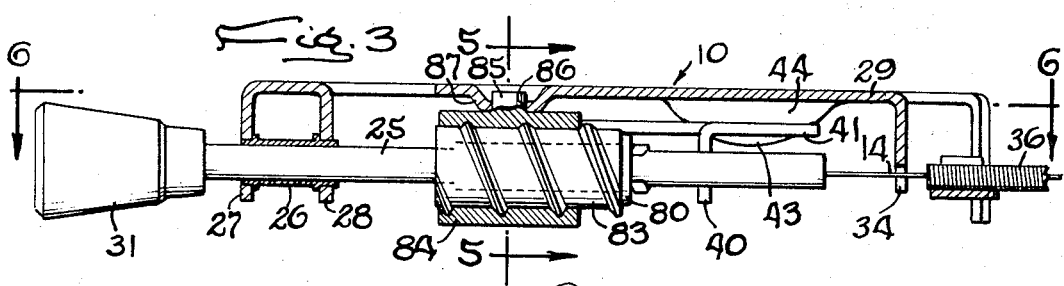
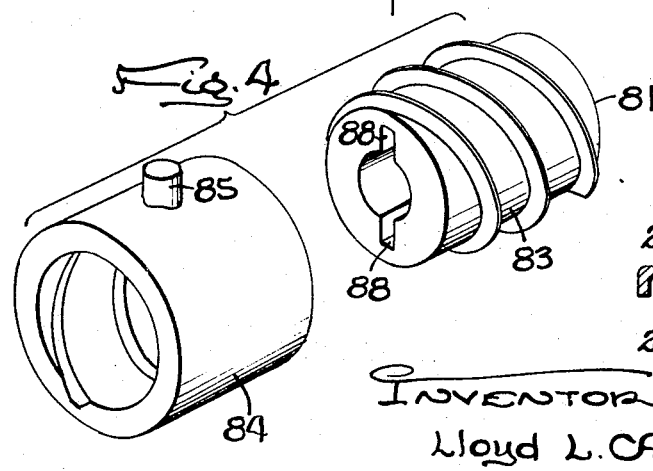
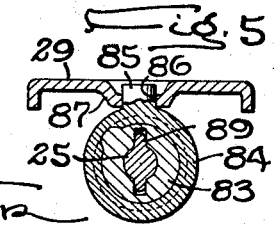
INVENTOR
Lloyd L. Anderson
by Wolfe, Hubbard, Voit & Osann
ATTORNEYS

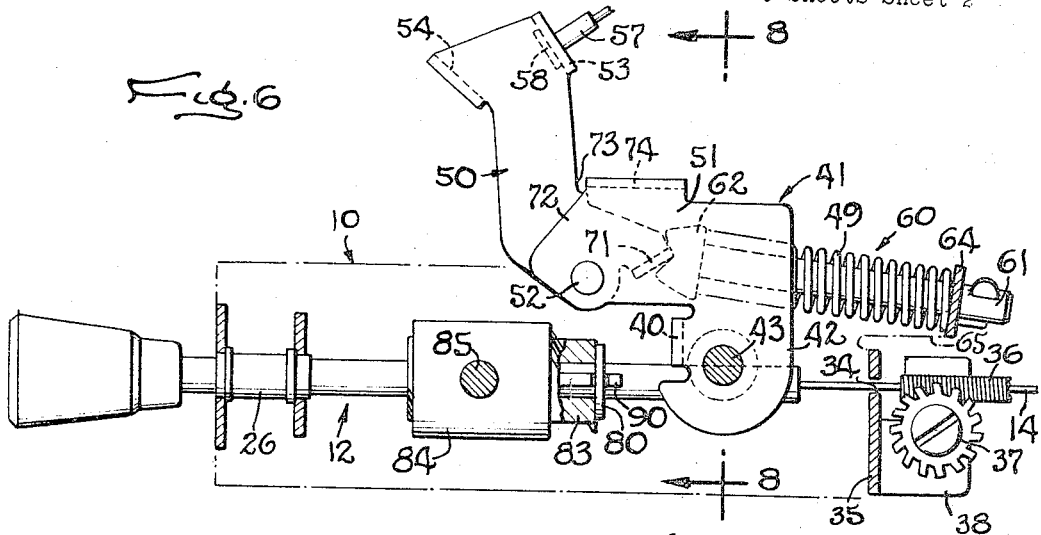
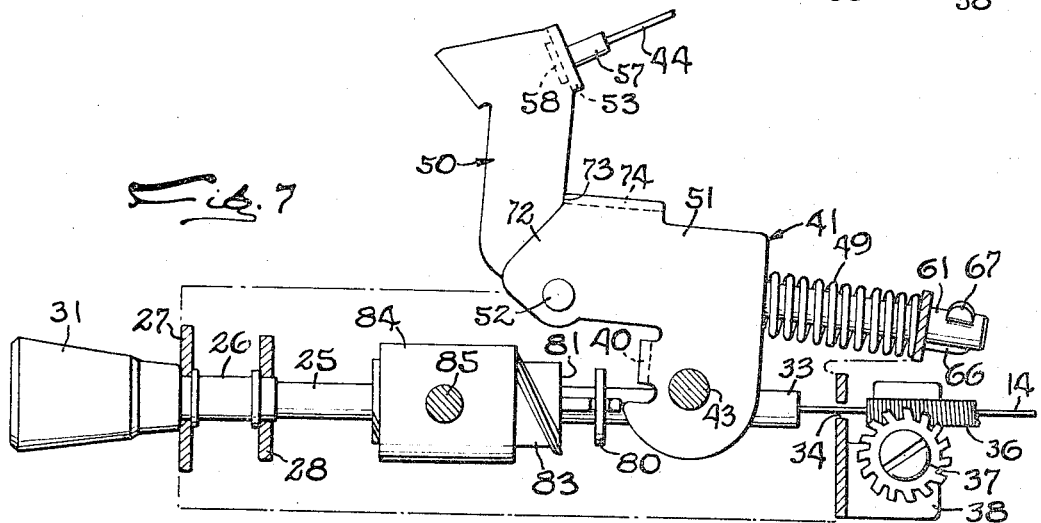
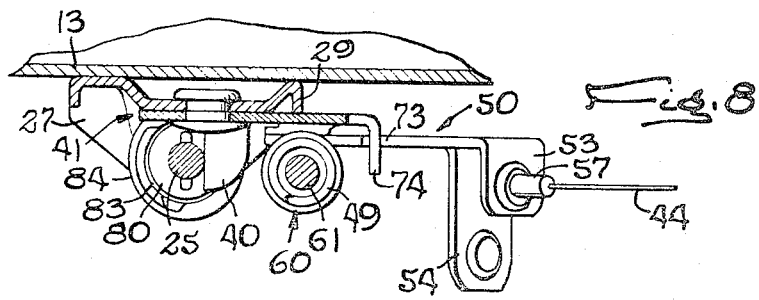

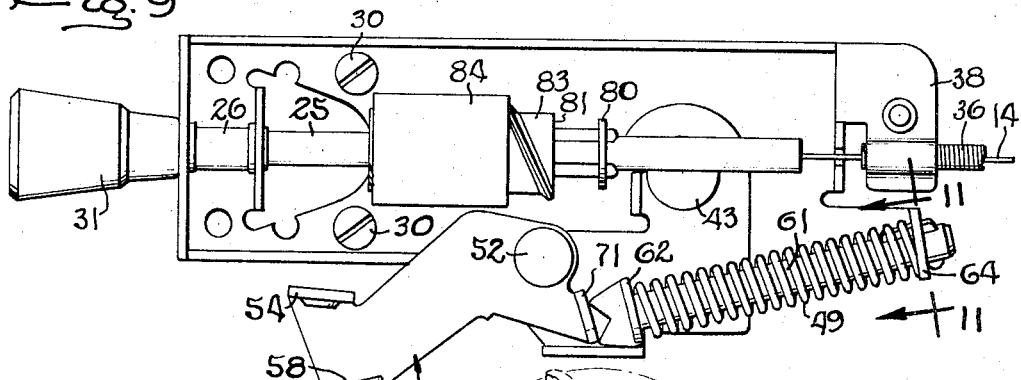

United States Patent Office 3,369,637
Patented Feb. 20, 1968

3,369,637
THROTTLE CONTROL
Lloyd L. Anderson, % Amerock Corporation,
4000 Auburn St., Rockford, Ill. 61103
Filed Dec. 10, 1965, Ser. No. 512,959
11 Claims. (Cl. 192—3)

ABSTRACT OF THE DISCLOSURE

A throttle control for holding the accelerator of a vehicle in a preselected position is operably connected to the vehicle brake operator and is adapted to release the accelerator when the brake operator is actuated. Should the connection between the brake operator and the throttle control fail, the latter is disabled and releases the accelerator automatially thereby making the control fail-safe. A memory device facilitating quick and easy restoration of the control to a preselected setting comprises a pair of engageable abutments which limit the setting of the control in an accelerating direction and which may be adjusted relative to each other to change the setting.

---

This invention relates to a throttle control for holding the accelerator pedel of an automotive vehicle in a depressed position in order to maintain the vehicle at a selected cruising speed. More particularly, the invention relates to a control having a throttle movable along a base to a selected position to depress the accelerator, and a clutch mounted on the base for holding the throttle in the selected position, the clutch being connected to the vehicle brake operator and being responsive to brake applying movements of the latter to release the throttle from its selected position thereby freeing the accelerator.

One object of the present invention is to provide a new and improved throttle control of the above character which is released automatically upon failure of the connection between the clutch and the brake operator.

A further object is to achieve the foregoing with a novel coupling and lever assembly for clutching the throttle in its selected position, and for releasing the throttle not only as an incident to normal brake application, but also as an incident to failure of the connection leading to the brake operator.

Another object is to provide a novel memory device facilitating quick and easy restoration of the control to a preselected setting.

A more detailed object is to provide a pair of opposed abutments on the throttle and the base for limiting motion of the throttle in the accelerating direction, and to vary the positions of the throttle in which the abutments become engaged simply by turning the throttle about its longitudinal axis.

Other objects and advantages of the invention will become apparent from the following detailed description taken in connection with the accompanying drawings, in which FIGURE 1 is a fragmentary perspective view of the interior of a vehicle equipped with a throttle control embodying the novel features of the present invention.

FIG. 2 is an enlarged fragmentary cross-sectional view taken substantially along the line 2—2 of FIG. 1.

FIG. 3 is a view similar to FIG. 2 with parts broken away and in moved positions.

FIG. 4 is an enlarged exploded perspective view of parts shown in FIG. 3.

FIG. 5 is a fragmentary cross-sectional view taken substantially along the line 5—5 of FIG. 3.

FIG. 6 is a fragmentary cross-sectional view taken substantially along the line 6—6 of FIG. 3.

FIG. 7 is a view similar to FIG. 6 with the parts in moved positions.

FIG. 8 is a fragmentary cross-sectional view taken substantially along the line 8—8 of FIG. 6.

FIG. 9 is an enlarged fragmentary bottom view of the throttle control shown in FIG. 1 with the parts in still other moved positions.

FIG. 10 is an enlarged fragmentary perspective view of part of FIG. 9, as viewed from the underside of the throttle in FIG. 1.

FIG. 11 is an enlarged fragmentary cross-sectional view taken substantially along the line 11—11 of FIG. 9.

FIG. 12 is an enlarged perspective view of the throttle.

As shown in the drawings for purposes of illustration, the invention is embodied in a throttle control 10 selectively operable to hold the accelerator pedal 11 of an automotive vehicle in a depressed condition thereby avoiding the need for the driver to apply continuous foot pressure to the accelerator to maintain the vehicle at a desired cruising speed. The control includes a throttle 12 mounted under the vehicle dash 13 and connected by a flexible cable 14 to the accelerator, the latter being moved to and held in a depressed position when the throttle is pulled outwardly along the underside of the dash.

As shown in FIG. 1, the accelerator pedal 11 is supported on the lower end of a curved arm 15 pivoted intermediate its ends on a yoke 16 rigid with the firewall 17 of the vehicle, and urged clockwise about the pivot 18 by a tension spring 19 stretched between the upper end of the arm and the firewall. A pin 20 extending through a yoke 21 at the upper end of the arm serves both to connect the accelerator to a linkage 22 leading to the vehicle carburetor (not shown) and to connect the cable 14 to the accelerator. For the later purpose, the cable projects through a hole in the pin and is clamped in a collar 24 with the collar adjusted to hold the cable nearly tight when the accelerator is in the idle position and when the throttle 12 is in its innermost position along the dash 13. Of course, the cable may be connected directly to the carburetor linkage 22.

The throttle 12 is a cylindrical rod 25 slidably mounted in a flanged bushing 26 (FIG. 3) fitted in and extending between a pair of spaced downwardly projecting supports 27 and 28 formed integrally with a sheet metal base 29, the base being fastened to the underside of the dash 13 by screws 30. A plastic hand knob 31 is fast on the outer end of the rod, and the opposite rod end 33 is connected to the inner end of the cable 14 which leads from the accelerator 11 toward the dash. The cable extends through a notch 34 formed in the edge of a downwardly projecting end wall 35 integral with the base, while beyond the end wall, the cable is guided by a sheath 36 clamped by a screw and lockwasher assembly 37 (see FIGS. 6 and 7) to an L-shaped projection 38 which is bent inwardly from the lower portion of the end wall and is disposed in a plane parallel to the base.

When it is desired to set the control 10, the driver first applies foot pressure to the accelerator pedal 11 to bring the vehicle up to the desired speed with the depression of the pedal stretching the spring 19 and producing slack in the cable 14. After such speed is reached, the throttle 12 is pulled outwardly from the inactive position shown in FIG. 2 to an accelerator-holding position shown in FIG. 3 to take up the slack in the cable and thereby retain the pedal in depressed condition, the stretched spring now tending both to urge the pedal to the idle position and to return the throttle to the inactive position of FIG. 2. To prevent the force exerted by the spring from returning the throttle to its inactive position after the driver releases his grasp on the knob 31, a gripping clutch 40 normally is urged into gripping engagement with the throttle rod 25. Herein, the clutch 40 is a vertical lug which is bent downwardly from a generally L-shaped, sheet metal lever 41 disposed in a plane between the throttle rod 25 and the base 29, one leg 42 of the lever being fulcrumed to turn about a vertical stud 43 fastened in a downwardly projecting boss 44 (FIG. 2) formed on the base. The lever is spring urged to turn counterclockwise (FIG. 6) about the stud 43 and swing the clutch lug against and into frictional engagement with the rod thereby to hold the throttle 12 against sliding back to the inactive position under the urging of the tension spring 19.

As a safety measure, a second flexible cable 44 is associated with the clutch 40 and extends inwardly to the vehicle brake operator 45. The cable is secured to a strap 46 which in turn is screwed to a clamp 47 wrapped around the brake arm 48. Application of the brake operator shifts the clutch out of engagement (FIG. 7) with the throttle rod 25 and consequently, the throttle 12 slides to its inactive position and the accelerator 11 returns to the idle position under the urging of the tension spring 19. Accordingly, the danger that the vehicle will be under power when it is necessary to slow or stop is avoided since the accelerator automatically returns to the idle position when the brake is applied.

In accordance with one aspect of the present invention, the clutch 40 is held against the throttle 12 by a spring 49 which acts through a coupling 50 to engage the clutch and retain the throttle in its selected position while the brake operator 45 is released, but which yields to release the clutch upon application of the brake. Should the connection between the brake and the throttle fail, however, the coupling automatically disables the spring thereby causing the clutch to disengage and release the throttle for return to its inactive position.

To these ends, the coupling 50 is movably mounted on the clutch lever 41 and the spring 49 normally acts on the coupling in a direction to hold the clutch lug 40 against the throttle rod 25, the coupling being held against movement relative to the clutch lever by the cable 44 leading from the coupling to the brake operator 45. During application of the brake, the coupling is shifted in one direction from its normal position into a normal release position and, during such shifting, engages the clutch lever and moves the latter in a direction to release the clutch lug from the throttle rod. If the cable breaks, the coupling is released to the action of the spring 49 which swings the coupling to an emergency release position in which the spring is disabled with respect to the clutch. With this arrangement, the throttle is released upon breaking of the cable as well as upon application of the brake and thus is fail-safe.

In this instance, the coupling 50 is an elongated sheet metal stamping pivoted adjacent one end on the free leg 51 of the clutch lever 41 by a vertical rivet 52. As shown most clearly in FIGS. 9 and 10, a pair of projections 53 and 54 extend downwardly from opposite edges of the free end portion 55 of the coupling lever, and are formed with holes 56 therethrough for reception of a ferrule 57 clamped on the brake cable 44. Herein, the ferrule and the cable are shown as extending through the hole in the projection 53 and are retained therein by a head 58 integral with the ferrule and having a diameter larger than that of the hole. As shown in FIG. 1, the brake cable extends in a straight line from the coupling to the brake operator 45 and, in addition to being substantially concealed, is disposed in a position where leg movements of the driver are not obstructed. The projection 54 is turned slightly relative to the projection 53 and is used for installing the control 10 in vehicles having a brake operator located further to the left than that shown in FIG. 1. Accordingly, the control may be applied to a wide variety of vehicle models with retention of the advantageous straight line connection leading to the brake operator.

The spring 49 acts on a plunger 60 comprising a guide rod 61 having a head 62 rigid with one end thereof. As shown in FIGS. 9 and 11, the other end portion of the rod is slidable in a hole 63 in a downwardly turned tab 64 integral with an arm 65 projecting inwardly from the base 29 beyond the end wall 35. The spring, which is in the form of a helical coil, is telescoped loosely over the guide rod and is compressed between the tab and the plunger head thus urging the latter generally to the left as viewed in FIG. 9. To prevent the rod from rotating about its own axis and to limit lengthwise movements of the rod through the tab, a pair of protruding ears 66 and 67 are formed on the inner end of the rod and are spaced diametrically opposite from each other. In the extended position of the plunger shown in FIGS. 9 and 11, the ear 66 projects into a notch 68 cut in the tab 64 on one side of the hole 63 to key the rod against rotation, while the ear 67 abuts the inner face of the tab and restricts further endwise movement of the rod toward the left. For ease of assembly, a pair of additional notches 69 and 70 are cut in the tab with each additional notch being spaced 90 degrees from the notch 68. To install the plunger in the tabs 64, the guide rod is slipped into the hole and the ears 66 and 67 are alined with the notches 69 and 70. The rod is then pushed to the right (FIG. 9) against the force of the spring until the ears slide through the notches, and then is rotated 90 degrees to aline the ear 66 with the notch 68. When the rod is released, it is forced back to the left by the contracted spring and assumes the assembled, extended position of FIG. 9 wherein the ear 66 projects through the notch 68 and the ear 67 abuts the face of the tab 64.

When the brake operator 45 is released, the coupling lever 50 normally is positioned as shown in FIG. 6 with the coil spring 49 contracted and the plunger head 62 bearing against a lug 71 which is bent downwardly from an end portion 72 of the coupling lever. In this position, the contracted spring tends to turn the coupling lever counterclockwise about the rivet 52. Such turning movement of the coupling about the rivet is prevented, however, by the brake cable 44 which is stretched tightly between the coupling projection 53 and the brake operator. Accordingly, since the coupling cannot move relative to the rivet and the clutch lever 41, the force imparted by the coil spring 49 acts through the coupling and the rivet and serves to turn the clutch lever counterclockwise about the stud 43 thereby urging the clutch lug 40 into gripping engagement with the throttle rod 25.

Application of the brake operator 45 to reduce the speed of the vehicle pulls the brake cable 44 inwardly and first swings the coupling lever 50 a very short distance about the rivet 52 (see FIG. 7) until an abutment or shoulder 73 formed on one edge of the coupling lever about mid-way between its ends engages an opposed abutment formed by a lug 74 on the free leg 51 of the clutch lever 41. After the abutments engage, further pulling of the cable swings the coupling lever and the clutch lever as a unit clockwise about the stud 43 thereby shifting the clutch lug 40 from the clutching position shown in FIG. 6 to the normal release position shown in FIG. 7. In this position, the clutch is disengaged from the throttle rod 25, and the accelerator spring 19 acts to slide the throttle inwardly thus releasing the accelerator 11 to the idle position. As an incident to the swinging of the coupling and clutch levers, the lug 71 shifts the guide rod 61 of the plunger 60 inwardly through the hole 63 in the tab 64 and thus further contracts the coil spring 49. Accordingly, upon release of the brake operator 45, the cable 44 slackens and the contracted spring extends to urge the coupling and the lever back to the clutching position of FIG. 6. Thereafter, the driver may reset the control 10 by pulling the throttle outwardly, sliding the throttle rod along the clutch lug against the holding force exerted by the coil spring. This force should be sufficient to hold the rod in place against the force of the accelerator spring while permitting manual adjustment of the throttle without undue difficulty.

In the preferred construction, the coupling abutment 73 is spaced about $\frac{1}{32}$ of an inch from the abutment lug 74 when the throttle 12 is clutched in order to prevent vibrations of the brake arm 48 from being transmitted to the clutch lug 40. If desired, however, the cable 44 may be adjusted so that the two abutments engage when the throttle is clutched, and in such an instance, application of the brake operates immediately to swing the lever 41 and the coupling 50 as a unit about the stud 43.

Should the brake cable 44 break or pull loose from either the ferrule 57 or the strap 46, the coupling lever 50 is released to the action of the coil spring 49 which extends and immediately turns the coupling lever clockwise about the rivet 52, as shown in FIG. 9, to the emergency release position. The ear 67 engages the tab 64 and limits further extension of the spring. Since the coupling now is free to turn away from the head 62 about the rivet, spring force no longer is transmitted through the rivet to the clutch lever 41, and the spring thus is disabled with respect to the clutch lug 40. Accordingly, the clutch lug merely rests loosely against the throttle rod 25, and the tension spring 19 slides the throttle 12 inwardly along the loose clutch and simultaneously returns the accelerator 11 to the idle position. This arrangement insures that the accelerator always will be released as the brake is applied, and also if the cable 44 should happen to break. Moreover, it is impossible to reset the control after such breakage without first repairing or replacing the cable.

In the present instance and as shown in FIG. 9, the coupling lug 71 swings entirely free of the plunger head 62 when the coupling 50 is turned to the emergency release position. While the plunger 60 could be coupled permanently to the lug, the disclosed arrangement is preferred since it assures that the spring will be completely disabled and will exert no force through the rivet 52 whenever the cable 44 breaks. In order that the plunger head and the lug may be re-engaged easily when the cable is repaired, or when the control is first installed, a U-shaped notch 75 (FIG. 10) is cut in one side of the lug 71 and the plunger head is formed with a V-shaped notch defined between two nibs 76 and 77. The top and bottom edges of the lug notch lie over and under the nib 76 as the coupling is swung from the position of FIG. 9 to the normal position shown in FIG. 6 and, in the normal position, the one side wall of the V-shaped notch between the nibs bears against the vertical edge of the lug notch thereby operably engaging the lug 71 with the plunger 60.

In accordance with another aspect of the present invention, the throttle 12 is both slidable and rotatable on the base 29 and a pair of opposed abutments 80 and 81 are supported on the throttle and the base, respectively, for engagement as the throttle slides outwardly from its inactive position, and also for adjustment of the position of one of the abutments in response to turning of the throttle about its longitudinal axis. Accordingly, the abutments form a mechanical memory which enables the driver to set the throttle for any predetermined cruising speed and, after the throttle has been released by application of the brake 45, to return the vehicle to the selected speed without applying foot pressure to the accelerator 11.

In this instance, the throttle rod 25 is journaled in the bushing 26 for rotation about its longitudinal axis, and the abutment 81 is the end of a sleeve 83 (see FIGS. 2–4) telescoped over the throttle rod and threaded into a nut in the form of a larger sleeve 84 anchored to the base 29 by a radial pin 85 projecting into a hole 86 in a boss 87 on the base above the outer sleeve as shown most clearly in FIG. 3. The inner sleeve 83 is formed with a pair of longitudinal internal grooves 88 slidably receiving two elongated guide ribs 89 on the throttle rod which key the sleeve to the rod for rotation with the latter and for longitudinal sliding thereon. The abutment 80 is a washer telescoped onto the inner end portion of the throttle rod and confined thereon between the inner ends of the ribs 89 and ears 90 projecting outwardly from the rod inside the washer.

With this arrangement, turning of the throttle rod 25 in one direction or the other turns the inner sleeve 83 within the outer sleeve 84 to adjust the position of the stop end 81 along the throttle rod, either toward or away from the washer 80. This varies the position of the rod in which the two stops abut against each other.

In operation, the driver depresses the accelerator pedal 11 to bring the vehicle up to desired speed, 60 m.p.h. for example, and then pulls the throttle 12 outwardly to maintain that speed without further application of foot pressure to the pedal. With the throttle thus set at 60 m.p.h., the stop 80 is positioned at a certain point along the base 29. The driver next rotates the knob 31 clockwise (FIG. 1) thereby rotating the sleeve 83 and causing the latter to thread axially inwardly within the sleeve 84 and to slide inwardly along the ribs 89 formed on the throttle until the end 81 of the sleeve abuts the stop. Thereafter, the knob becomes more difficult to rotate since further rotation causes the throttle to slide inwardly against the retaining force of the clutch 40, and accordingly, the driver can ascertain exactly when the sleeve end abuts the stop by the ease with which the knob is rotated.

When the brake operator 45 is applied to release the clutch 40 thereby causing the throttle 12 and the stop 80 to slide inwardly, the sleeve 83 remains stationary and the end 81 thereof in effect remembers the previous position of the stop. Therefore, to reset the control 10 after releasing the brake, the driver need merely pull the throttle outwardly until the stop slides into engagement with the sleeve end. Since the stop and the throttle then are located in their previously set positions, the vehicle will accelerate automatically to the selected speed of 60 m.p.h., without foot depression of the accelerator pedal 11, and without further adjustment of the position of the throttle relative to the base 29.

If it is desired to reduce the cruising speed of the vehicle, the driver may turn the knob 31 clockwise thus causing the sleeve end 81 to slide the stop 80 and the throttle 12 inwardly against the force of the clutch 40. An increase in speed may be effected by pulling the throttle outwardly, while at the same time rotating the knob counterclockwise thereby moving the sleeve end from right to left (FIG. 6) to permit the stop to slide outwardly under the pulling force. In either instance, the end of the sleeve remembers the newly selected speed and, after slowing or stopping, the control may be reset to that speed by simply pulling the throttle outwardly until it stops.

I claim as my invention:

1. A throttle control for use in a vehicle having an accelerator movable in one direction to accelerate the vehicle and yieldably urged in the opposite direction, and a brake operator movable between applied and released positions, said control having, in combination, a base, a throttle movable back and forth on said base between first and second positions and adapted to be connected to the accelerator to shift the latter in said one direction during movement of the throttle toward said second position, a gripping clutch supported on said base for movement toward said throttle into gripping engagement therewith and away from the throttle to release the latter, a coupling connected to said clutch and movable from a normal position in one direction to an emergency release position and in the other direction to a normal release position, means for connecting said coupling to the brake operator and moving the coupling to said normal release position as the operator moves to said applied position, said connecting means holding said coupling in said normal position when the operator is in the released position, a spring acting between said base and said coupling to urge the latter toward said emergency release position, said spring acting through said coupling on said clutch to hold the latter against said throttle when the coupling is in said normal position, means on said coupling for moving said clutch away from said throttle as the coupling moves to said normal release position, and means disabling said spring when said coupling is in said emergency release position.

2. A throttle control as defined in claim 1 further including a lever supporting said clutch, and a first pivot member mounting said lever on said base for movement of said clutch toward and away from said throttle.

3. A throttle control as defined in claim 2 further including a second pivot member connecting said coupling to said lever, and opposed abutments on said lever and said coupling engageable during movement of the latter to said normal release position.

4. A throttle control as defined in claim 3 in which said coupling and said second pivot member swing relative to said first pivot member during movement of said coupling to said normal release position, and in which said coupling swings relative to said first and second pivot members as said coupling moves to said emergency release position.

5. A throttle control as defined in claim 3 in which said spring is connected to said coupling and acts through said second pivot member on said lever to hold said clutch against said throttle when said coupling is in said normal position.

6. In a throttle control, the combination of, a base, an elongated throttle axially slidable back and forth on said base, a lever turnable relative to said base about a predetermined axis and having means engageable with said throttle, a pivot member mounted on said lever, a coupling swingable about said pivot member and having an abutment surface engageable with said lever, a spring urging said coupling to swing about said pivot member and urging said lever to turn about said predetermined axis, and means connected to said coupling for preventing the latter from swinging about said pivot member under the urging of said spring.

7. In a throttle control, the combination of, a base, an elongated throttle supported on said base for back and forth endwise sliding and also for rotation about its longitudinal axis, a first abutment on said throttle movable back and forth with the latter relative to said base, a threaded first sleeve telescoped over said throttle, a second sleeve threadably connected to said first sleeve and telescoped over said throttle for rotation therewith, and a second abutment associated with said second sleeve and movable toward and away from said first abutment upon rotation of said throttle to vary the position of the throttle in which said first abutment engages said second abutment to stop sliding of the throttle.

8. The combination defined in claim 7 in which said first sleeve comprises an internally threaded nut anchored to said base, and said second sleeve is threaded into said nut.

9. The combination defined in claim 7 further including first guide means extending axially along said throttle, and complementary guide means associated with one wall of said second sleeve cooperating with said first guide means for preventing said throttle from rotating relative to said second sleeve.

10. In a throttle control, the combination of, a base, an elongated throttle supported on said base for endwise sliding in one direction to an active position and also for rotation about its longitudinal axis, a first abutment on said throttle and slidable with the latter relative to said base, an opposed abutment supported on said base for adjustment longitudinally of said throttle and engageable with said one abutment to stop said throttle when the throttle is slid in said one direction, and means responsive to rotation of said throttle for adjusting said opposed abutment along said base and thereby varying the position of the throttle in which said first abutment engages said opposed abutment to stop the throttle.

11. In a throttle control, the combination of, a base, an elongated throttle supported on said base for endwise sliding in one direction to an active position and also for rotation about its longitudinal axis, a first abutment on said throttle and slidable with the latter relative to said base, an opposed abutment supported on said base and engageable with said one abutment to stop said throttle when the throttle is slid in said one direction, and means responsive to rotation of said throttle for adjusting one of said abutments relative to the other abutment and thereby varying the position of the throttle in which said abutments become engaged to stop the throttle.

References Cited
UNITED STATES PATENTS

| | | | |
|---|---|---|---|
| 2,853,164 | 9/1958 | Sturdy | 192—3 |
| 2,979,172 | 4/1961 | Eshbaugh et al. | 192—3 |

DONLEY J. STOCKING, *Primary Examiner.*

ARTHUR T. McKEON, *Examiner.*